United States Patent [19]
Odaka

[11] Patent Number: 5,155,636
[45] Date of Patent: Oct. 13, 1992

[54] APPARATUS AND METHOD FOR RECORDING AND REPRODUCING DIGITAL DATA

[75] Inventor: Kentaro Odaka, Yokohama, Japan

[73] Assignee: Sony Corporation, Tokyo, Japan

[21] Appl. No.: 752,950

[22] Filed: Aug. 28, 1991

Related U.S. Application Data

[63] Continuation of Ser. No. 507,004, Apr. 10, 1990, abandoned, which is a continuation of Ser. No. 459,934, Jan. 23, 1983, abandoned.

[30] Foreign Application Priority Data

Jan. 23, 1982 [JP] Japan ......................................... 9780

[51] Int. Cl.⁵ .......................... H04N 5/782; G11B 5/09
[52] U.S. Cl. ....................................... 360/32; 360/19.1
[58] Field of Search ................... 360/8, 9.1, 10.3, 32, 360/19.1, 38.1, 53, 47; 371/13, 38.1, 40.1, 40.2, 40.4, 37.7; 369/59

[56] References Cited

U.S. PATENT DOCUMENTS

| | | | |
|---|---|---|---|
| 3,873,977 | 3/1975 | McIntosh | 360/40 |
| 4,282,551 | 8/1981 | Kanazawa et al. | 360/32 |
| 4,303,950 | 12/1981 | Taniguchi et al. | 360/19.1 |
| 4,327,382 | 4/1982 | Tanaka | 360/32 |
| 4,329,708 | 5/1982 | Yamamoto et al. | 360/38.1 |
| 4,353,098 | 10/1982 | Heinz et al. | 360/19.1 |
| 4,375,100 | 2/1983 | Tsuji et al. | 371/37.7 |
| 4,375,101 | 2/1983 | Cerrocchio | 360/53 |
| 4,390,906 | 6/1983 | Furumoto et al. | 360/19.1 |
| 4,392,162 | 7/1983 | Yamamoto | 360/10.3 |
| 4,463,387 | 7/1984 | Hashimoto et al. | 360/32 |
| 4,477,844 | 10/1984 | Nakano et al. | 360/8 |

*Primary Examiner*—Donald McElheny, Jr.
*Attorney, Agent, or Firm*—Hill, Van Santen, Steadman & Simpson

[57] ABSTRACT

Apparatus for recording and reproducing digital signals wherein the digital signal is recorded or reproduced during a data blank interval which is a buffer during which the rotary heads change over or is spliced between data due to time base compression and wherein redundant data is recorded for error detection or error correction during said data blank interval before and after the data transmitting interval.

6 Claims, 3 Drawing Sheets

APPARATUS AND METHOD FOR RECORDING AND REPRODUCING DIGITAL DATA

This is a continuation of application Ser. No. 507,004, filed Apr. 10, 1990, now abandoned, which is a continuation of application Ser. No. 459,934, filed Jan. 23, 1983, now abandoned which is related to application Ser. No. 646,144 filed Feb. 5, 1982 by Nakano, Machida, Kantaro Odaka (applicant in the present application), now U.S. Pat. No. 4,477,844 which issued on Oct. 16, 1984.

BACKGROUND OF THE INVENTION

1. Field of the Invention

This invention relates in general to apparatus for recording and reproducing digital signals and particularly to apparatus for recording and reproducing digital signals in which the data that is recorded and reproduced is converted into a blank data interval using time base compression of the information.

2. Description of the Prior Art

Various apparatus are known for recording and reproducing audio signals such as PCM audio processors for recording PCM audio signals converted into a video signal by using a VTR, or a digital audio disc (DAD) which can be used only for reproduction. Also, apparatus for recording and reproducing a PCM magnetic tape of the fixed head type for business use are known. However, compact small and light apparatus which enables recording and reproduction has not been available and there is a great need for small compact light apparatus for home and portable uses as the number of PCM audio/video equipment increases.

Particularly since it is necessary to miniaturize the magnetic tape medium for use in a small VTR with a built in video camera, the tape running speed must be relatively slow to obtain long time recording. Consequently, the use of a conventional analog recording system generally causes deterioration of sound quality and when editing by using dubbing operation causes deterioration of the sound quality as a function of the number of dubbing operations.

For this reason, a method is known wherein only the audio signals are recorded in the PCM signal format. However, where the PCM audio signal is recorded together with a color video signal, a PCM audio signal is normally recorded at the end of the recording track in a VTR of the rotary head type and the recording area is located near the change over interval of the head which causes many troubles such as drop out error in the data and so forth.

Additionally, in case of recording only a PCM audio signal with a rotary head the above problems also arise.

SUMMARY OF THE INVENTION

The present invention solves many of the problems of the prior art and has an object to provide apparatus for recording and/or reproducing digital signals which can effectively use the recording area for the data.

Another object of the invention is to provide apparatus for recording and/or reproducing digital signals which increase the ability to correct errors in the data.

Another object is to provide apparatus for recording and/or reproducing digital signals which has a greater or the same error correction ability for data at the end of the tape as for data recorded in the center section of the recording tape.

A further object of the invention is to provide apparatus for recording and reproducing digital signals which can be used in a phase locked loop circuit but also can record redundant data which can be used for error detection and correction in the data blank interval.

The objects of the invention are accomplished by providing apparatus for recording or reproducing a digital signal which records and/or reproduces data during a data blank interval which is a buffer for a change over of the rotary head or a splice between data for time base compression with the apparatus being able to record redundant data which can be used for error detection or error correction in the data blank interval before or after the data interval.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
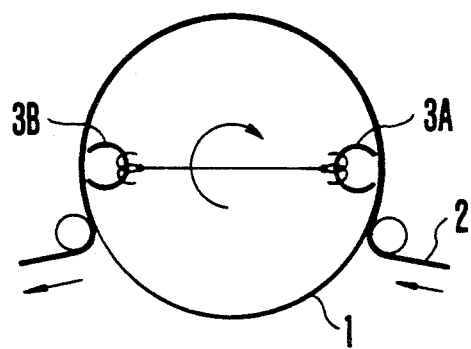
FIG. 1 is a top schematic diagram illustrating a dual head arrangement for a VTR.

FIG. 1 illustrates an example where both the video and the audio pulse code modulated signals are recorded on a magnetic tape 2 and reproduced in the same manner as in the two head rotary type VTR. As shown in FIG. 1, the magnetic tape 2 passes around the circumferential surface of a rotary drum with a tapewrap angle of approximately 220° and a pair of rotary heads 3A and 3B are mounted on a rotating arm and rotated as shown by the arrow so as to alternately contact the magnetic tape with overlap interval corresponding to the tapewrap angle of 40°. The heads 3A and 3B are spaced 180° apart as shown.

Figure 2:
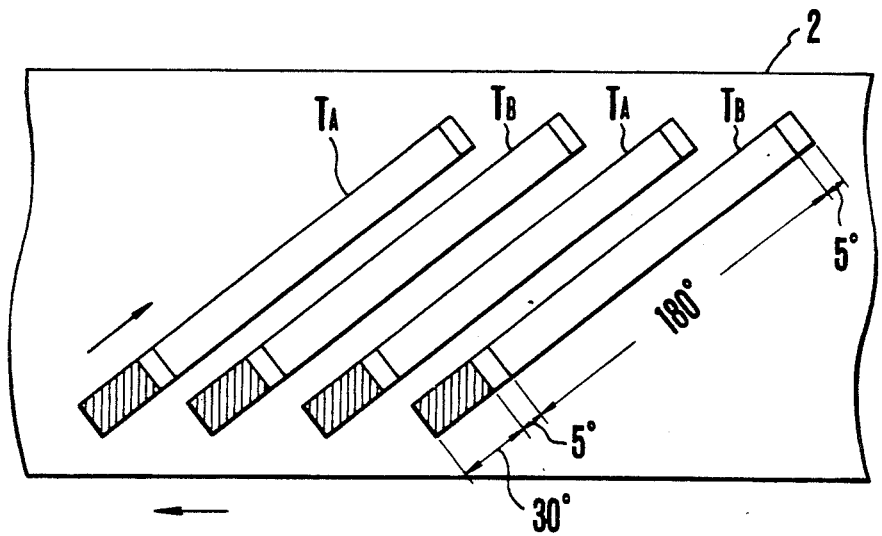
FIG. 2 is a plan view illustrating the tracks on magnetic tape used in the VTR of the invention.

As illustrated in FIG. 2, a track $T_A$ is formed on the magnetic tape 2 by the rotary head 3A and a track $T_B$ is formed on the tape by rotary head 3B. An audio PCM signal of one field which has been time base compressed is recorded in the range of 30° at the starting end of each of the tracks and is indicated by an oblique line hatching in FIG. 2 in the overlap interval corresponding to the tapewrap angle of 40° the tracks $T_A$ and $T_B$. In an area 5° before and after the recording area of the audio PCM signal, no data is recorded due to the variations of the head changeover points before and after recording. Video signals are recorded on the remaining portion of the 180° of the magnetic tape.

Figure 3:
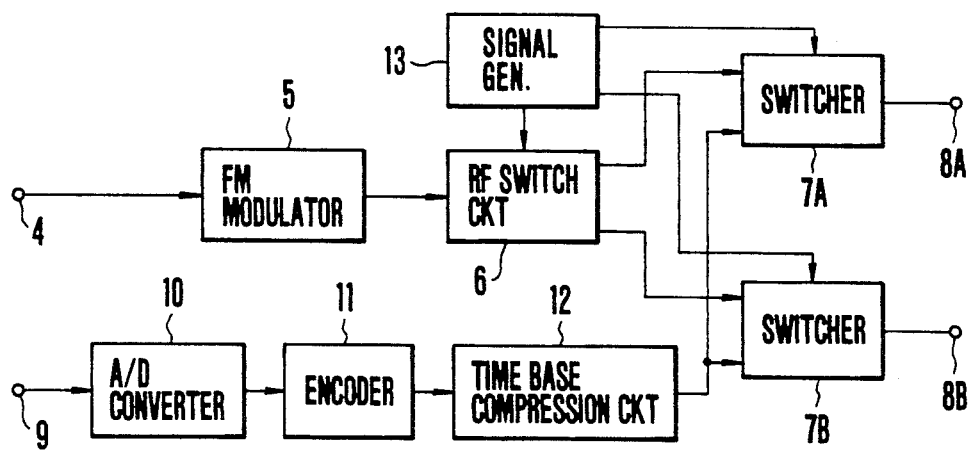
FIG. 3 is a block diagram illustrating the invention.

FIG. 3 is a block diagram of a circuit construction which can be used for a recording operation such as shown in FIG. 1 wherein a video signal is supplied to an input terminal 4 and is FM modulated by an FM modulator 5 and is then divided into two signal routes by RF switch circuit 6. A switching circuit for, the RF switch circuit is formed by a signal generator 13 which magnetically detects the rotating phase of the rotary head as, for example, by rotating magnets on the shaft which turns the arm upon which the heads 3A and 3B are mounted and then detecting with a magnetic detector the position of the magnets on such shaft. This switching signal switches the RF switch 6. The output of RF switch circuit is supplied to switchers 7A and 7B where it is synthesized with audio PCM signals and then supplied to output terminals 8A and 8B and is then supplied to the rotary heads 3A and 3B for recording on the tape 2. The signal is supplied through a recording amplifier and a rotary transformer which are not shown since such circuits are well known to those skilled in the art.

The switchers 7A and 7B are controlled by the detected signal from the signal generator 12 or by timing signal formed from the output of a counter for counting clock pulses.

An audio signal which is to be recorded is supplied to an input terminal 9 and converted into digital information by the analog to digital converter 10 and is then supplied to an encoder 11 where processing occurs such as the addition of a redundant code of an error correction code are accomplished. The output of the encoder 11 is supplied to a time base compression circuit 12, and audio signals in one field interval are recorded in the recording area corresponding to the tapewrap angle of 30° as described above and illustrated in FIG. 2. The time base compression circuit 12 forms the audio PCM data which has been time base compressed by using a random access memory and using readout clock pulses which have a frequency which is higher than that of the write clock pulses. Such PCM data which has been time base compressed is synthesized with the FM modulated video signals in the switchers 7A and 7B and supplied to the recording heads 3A and 3B.

Figure 4:
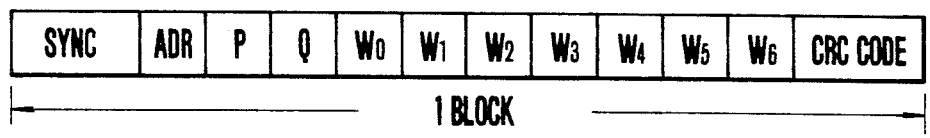
FIG. 4 illustrates one block of data of the invention.

FIG. 4 illustrates one block of audio PCM data which is to be recorded. In the first position, is a block sync signal SYNC, then an address signal ADR. Following this two parity codes P and Q are utilized for error correction and then a seven word PCM block of data $W_0$–$W_6$ are formed. In this embodiment, 150-block data is formed from the audio PCM signal for one field of the video signal.

Figure 5:
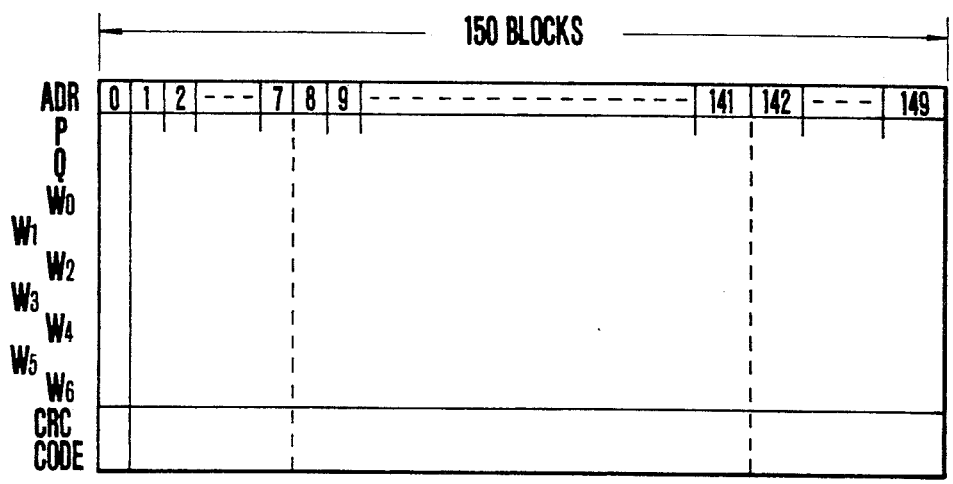
FIG. 5 illustrates in block form the error correction code in an embodiment of the invention.

As illustrated in FIG. 5, an error correction code is formed which consists of data of 150-block having the addresses from 0 to 149 as a unit. Each of the data blocks has the form illustrated in FIG. 4. The two parity codes $P(n)$ and $Q(n+16)$ are produced by using modulo 2 (MOD. 2) of the following expressions.

$$P(n)=Q(n+16)+W_0(n+32)+W_1(n+48)+W_2(n+64)+W_3(n+80)+W_4(n+96)+W_5(n+112)+W_6(n+128)$$

$$Q(n+16)=P(n+1)+W_0(n+30)+W_1(n+36)+W_2(n+33)+W_3(n+45)+W_4(n+54)+W_5(n+61)+W_6(n+72)$$

As the above expressions illustrate, the two parity codes are produced from the other parity code and each word of the PCM data which has been respectively interleaved. The block numbers added in each word of the above expressions comply with (MOD. 150). Thus, the interleaving is accomplished in 150 blocks. The code correcting code CRC is used for error detection for the address code ADR and the data P, Q, and $W_0$–$W_6$. The production polynomial can be, for example $(X^{16}+X^{12}+X^5+1)$.

The signal which is reproduced from magnetic tape 2 is separated into an FM modulated video signal and an audio PCM signal. The audio PCM signal is processed using time base expansion, error detection, error correction and is converted to an analog audio signal using a digital to audio converter. As is illustrated in FIG. 5 for error correction, a 150-block data is written in the block addresses of the memory area of the random access memory (RAM). However, the data in the block which is determined to have no errors as detected by the code correcting code CRC is utilized and written.

Figure 6:
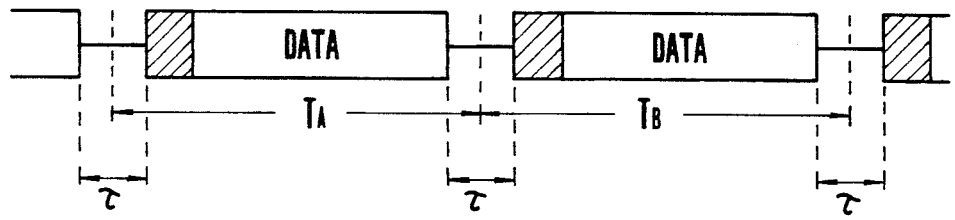
FIG. 6 is a time chart for illustrating an example for recording and reproducing digital signals according to the invention.

As described above, the data blank interval exists due to the changeover of the two rotary heads 3A and 3B and, thus, the output of the time base compression circuit 12 in FIG. 3 or the input to a time base expansion circuit is as shown in FIG. 6. For a rotary two head type apparatus, the interval $T_A$ corresponds to the reproduction interval of the rotary head 3A and the interval $T_B$ corresponds to the interval of the reproduction output of the other rotary head 3B. No data exists in the interval : of the splice between the intervals $T_A$ and $T_B$. Thus, when the data is discontinuous, the reproduction of the clock is also interrupted so that as indicated with oblique section lines in FIG. 6, the preamble interval before the data has the same frequency component as the clock frequency for the first section of the data behind the data blank interval. During the preamble interval shown in oblique lines, the phase lock loop circuit PLL is connected.

However, when using a miniaturized cassette tape, it is disadvantageous to use the recordable area for merely lead in of the PLL circuit because of the inefficient usage of the magnetic tape of the cassette. For this reason, the present invention allows the effective use of the tape by not only recording the clock signal, but also recording data which can be used for error detection or correction of the data. Thus, in the present invention, the area indicated by shaded lines is used not only for the clock signal but also for error detection and error correction of the data.

Figure 7:
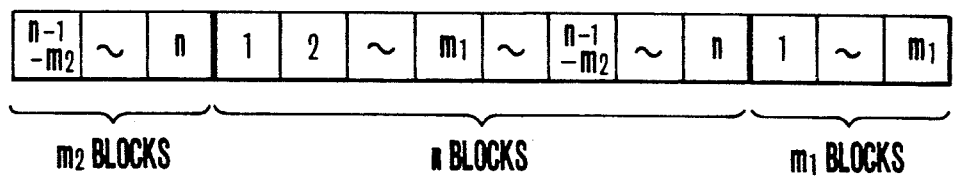
FIG. 7 is a schematic diagram for describing the data frame of the present invention.

As shown in FIG. 7, a part of the data of n blocks is obtained and recorded respectively in the data blank intervals which are positioned before and after the data of n blocks (Nos. 1 to n). The $m_2$ blocks of No. (n-1-$m_2$) through No. n in the latter end portion of the n blocks are recorded in the data blank interval which is located at the formal position of the n blocks. The $m_1$ blocks of Nos. 1 through $m_1$ are recorded in the data blank interval which is located at the latter portion of the n blocks. In this manner, by recording and writing twice the data by taking out a part of the data, it is possible to perform error correction of the data which locates the end of the n blocks by using the collation method. It is possible to record the redundant code of the error correction code with respect to the data at the end portion in the data blank interval instead of recording it twice also.

By controlling the readout of the data from the RAM of the time base compression circuit 12 illustrated in FIG. 3, the above mentioned portions of the data which have been extracted from the audio PCM data are respectively recorded in the start and end portions of the data recording area indicated by oblique lines in FIG. 2.

Data of 8 blocks of block addresses of 142 through 149 in the data of 150 blocks such as formed in FIG. 5 is recorded in the head portion of the recording area of the PCM data and then the data blocks of 150 blocks of 0-149 is recorded and then the data in the 8 blocks 0-7 is recorded. Since the encoder 11 is provided with the RAM for remembering the 150 block data as shown in FIG. 5, it is possible to easily record the parts of the data repeatedly in such sequence as given above by controlling the read address of the RAM.

It is to be understood from the description of the above-described embodiment that the redundant data which is used for error detection or error correction is recorded in the data blank interval which provides a buffer for the changeover of the rotary heads or a splice between data. Thus, as distinguished from a conventional apparatus which has a preamble signal inserted for only producing a bit clock signal, it is possible in the invention to effectively use the data recording area for error correction and otherwise. Thus, in the case of rotary head type recording/reproducing apparatuses since the contact status of the rotary heads with the magnetic tape is unstable at the end portion of the track, the probability of erroneous data in that area is high. However, according to the present invention, it is possible to increase the error correction ability of the data in these end portions so that it is higher than that of the data in the center portions.

The present invention may be applied where only an audio PCM signal is recorded by using a rotary head. In this case, the tapewrap angle of the magnetic tape relative to the tape guide signal may be set to be 180° or less. Also, in a fixed head type PCM tape recorder there are cases in which the data blank interval is formed in the splice of the data for the purpose of editing. However, it is possible to apply the present invention in such cases.

Although preferred embodiments of the invention have been described and illustrated, it is to be appreciated that many modifications and variations of the invention are possible in light of the above teachings and within the purview of the appended claims without departing from the spirit and intended scope of the invention.

I claim as my invention:

1. An apparatus for recording data on a moving recording medium comprising:

a time base compression circuit for receiving and time compressing in blocks of digital data wherein said time base compression circuit comprises, memory means for storing said digital data, and means for reading said n blocks of digital data from said memory means and for arranging the same in a manner such that the arranged digital data comprises M2 blocks of digital data followed by said n blocks of digital data, followed by M1 blocks of digital data, wherein said M2 blocks of digital data is a part of said n blocks of digital data located at the end of said n blocks of digital data and said M1 blocks of digital data is a part of said n blocks of digital data located at the beginning of said n blocks of digital data, and magnetic head means for recording said arranged digital data on said recording medium.

2. The method of recording data on a moving magnetic medium comprising the steps of, receiving and compressing n blocks of digital data, storing said digital data in a memory means, reading and arranging said n blocks of digital data from said memory means such that said digital data is arranged with M2 blocks of digital data followed by said n blocks of digital data, followed by M1 blocks of digital data, wherein said M2 blocks of digital data is a part of said n blocks of digital data located at the end of said n blocks of digital data and said M1 blocks is a part of said n-blocks of digital data located at the beginning of said n blocks of digital data and, recording said arranged digital data on said recording medium.

3. An apparatus for recording and reproducing data on a moving magnetic tape comprising:

magnetic head means mounted around the circumference of a rotary head wheel and said magnetic tape extending around said rotary head wheel so that said magnetic head means scans said tape to form slant tracks TA and slant tracks TB, a signal generator mounted so as to detect the phases of said magnetic head means, first and second switchers connected to outputs of said signal generator to control input signals to said magnetic head means through said first and second switchers, a time base compression circuit connected to said magnetic head means through said first and second switchers and receiving and compressing n block of digital data, a memory means in said time base compression circuit which stores said compressed n block of data, and means for reading said n blocks of digital data from said memory means and for arranging the same in a manner such that the arranged digital data comprises M2 blocks of digital data followed by said n blocks of digital data, followed by M1 blocks of digital data, wherein said M2 blocks of digital data is a part of said n blocks of digital data located at the end of said n blocks of digital data and said M1 blocks of digital data is a part of said n blocks of digital data located at the beginning of said n blocks of digital data and supplying said arranged data to said magnetic head means so that it is recorded in a first mode on said slant tracks TA and TB, and wherein in a second mode said arranged data is reproduced from said slant tracks TA and TB by said magnetic head means.

4. Apparatus according to claim 3 wherein said data is a digital audio signal.

5. Apparatus according to claim 3 wherein said data is digital PCM data.

6. A method for recording data on a moving magnetic tape comprising, the steps of scanning said magnetic head means mounted around the circumference of a rotary head wheel and said magnetic tape extends around said rotary head wheel so that said magnetic head means scans said tape to form slant track TA and slant TB, detecting with a signal generator mounted so as to detect the phases of said magnetic head means, controlling with first and second switchers which are connected to outputs of said signal generator input signals to said magnetic head means through said first and second switchers, compressing n blocks of digital data with a time base compression circuit, storing said compressed n blocks of digital data in a memory in said time base compression circuit, reading said compressed n blocks of digital data and arranging it in a manner such that the arranged digital data comprises M2 blocks of digital data followed by said n blocks of digital data, followed by M1 blocks of digital data, wherein said M2 blocks of digital data is a part of said n blocks of digital data located at the end of said n blocks of digital data and said M1 blocks of digital data is a part of said n blocks of digital data located at the beginning of said n blocks of digital data, and supplying said arranged digital data to said magnetic head means through said first and second switchers which record it on said slant tracks TA and TB.

* * * * *